(12) United States Patent
Melton et al.

(10) Patent No.: US 9,327,822 B1
(45) Date of Patent: May 3, 2016

(54) VARIABLE GEOMETRY AIRCRAFT WING SUPPORTED BY STRUTS AND/OR TRUSSES

(71) Applicant: The United States of America as Represented by the Administrator of the National Aeronautics & Space Administration (NASA), Washington, DC (US)

(72) Inventors: John E. Melton, Hollister, CA (US); Michael R. Dudley, Los Altos, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 121 days.

(21) Appl. No.: 14/179,401

(22) Filed: Feb. 12, 2014

Related U.S. Application Data

(60) Provisional application No. 61/764,797, filed on Feb. 14, 2013.

(51) Int. Cl.
*B64C 3/38* (2006.01)
(52) U.S. Cl.
CPC ..................................... *B64C 3/385* (2013.01)
(58) Field of Classification Search
CPC ................................. B64C 3/38; B64C 3/385
USPC .......................................................... 244/48
See application file for complete search history.

(56) References Cited

U.S. PATENT DOCUMENTS

| | | | | | |
|---|---|---|---|---|---|
| 1,025,063 | A | * | 4/1912 | Hubschman | 244/90 R |
| 1,740,016 | A | * | 12/1929 | Hubschman | 244/46 |
| 2,643,076 | A | | 6/1953 | Hurel | |
| 3,971,535 | A | * | 7/1976 | Jones | 244/46 |
| 4,132,374 | A | | 1/1979 | Abell | |
| 4,836,470 | A | * | 6/1989 | Criswell | 244/2 |
| 6,601,795 | B1 | | 8/2003 | Chen | |

OTHER PUBLICATIONS

Jobe, et al., "Wing Planforms for Large Military Transports," AIAA Aircraft Systems and Technology Conference, AIAA 78/1470, Aug. 21, 1978.
Curry, et al., "The Unique Aerodynamic Characteristics of the AD-1 Oblique-Wing Research Airplane," Journal of Aircraft, AIAA-82/1329, 1982.

(Continued)

*Primary Examiner* — Christopher P Ellis
*Assistant Examiner* — Richard G Davis
(74) *Attorney, Agent, or Firm* — Christopher J. Menke; Robert M. Padilla; John F. Schipper

(57) ABSTRACT

The present invention provides an aircraft having variable airframe geometry for accommodating efficient flight. The aircraft includes an elongated fuselage, an oblique wing pivotally connected with said fuselage, a wing pivoting mechanism connected with said oblique wing and said fuselage, and a brace operably connected between said oblique wing and said fuselage. The present invention also provides an aircraft having an elongated fuselage, an oblique wing pivotally connected with said fuselage, a wing pivoting mechanism connected with said oblique wing and said fuselage, a propulsion system pivotally connected with said oblique wing, and a brace operably connected between said propulsion system and said fuselage.

22 Claims, 18 Drawing Sheets

(56) References Cited

OTHER PUBLICATIONS

Naghshineh-Pour, "Structura Optimization and Design of a Strut-Braced Wing Aircraft", M.Sc. Thesis, Virginia Polytechnic Institute and State University, Nov. 30, 1998.

Grasmeyer, "Multidisciplinary Design Optimization of a Transonic Strut-Braced Wing Aircraft", AIAA 99/0010, 37th AIAA Aerospace Sciences Meeting and Exhibit, Jan. 11, 1999.

Hirschberg et al., "A Summary of a Half Century of Oblique Wing Reseach" 45th AIAA Aerospace Sciences Meeting and Exhibit, AIAA 2007-150, Jan. 8, 2007.

Larrimer, "Thinking Obliquely: Robert T. Jones, the Oblique Wing, NASA's AD-1 Demonstrator, and its Legacy," http://www.nasa.gov/connect/ebooks/thinking_obliquely_detail.html#.UoUv7eJljot, NASA Aeronautics Book Series, Aug. 15, 2013, 17-69.

\* cited by examiner

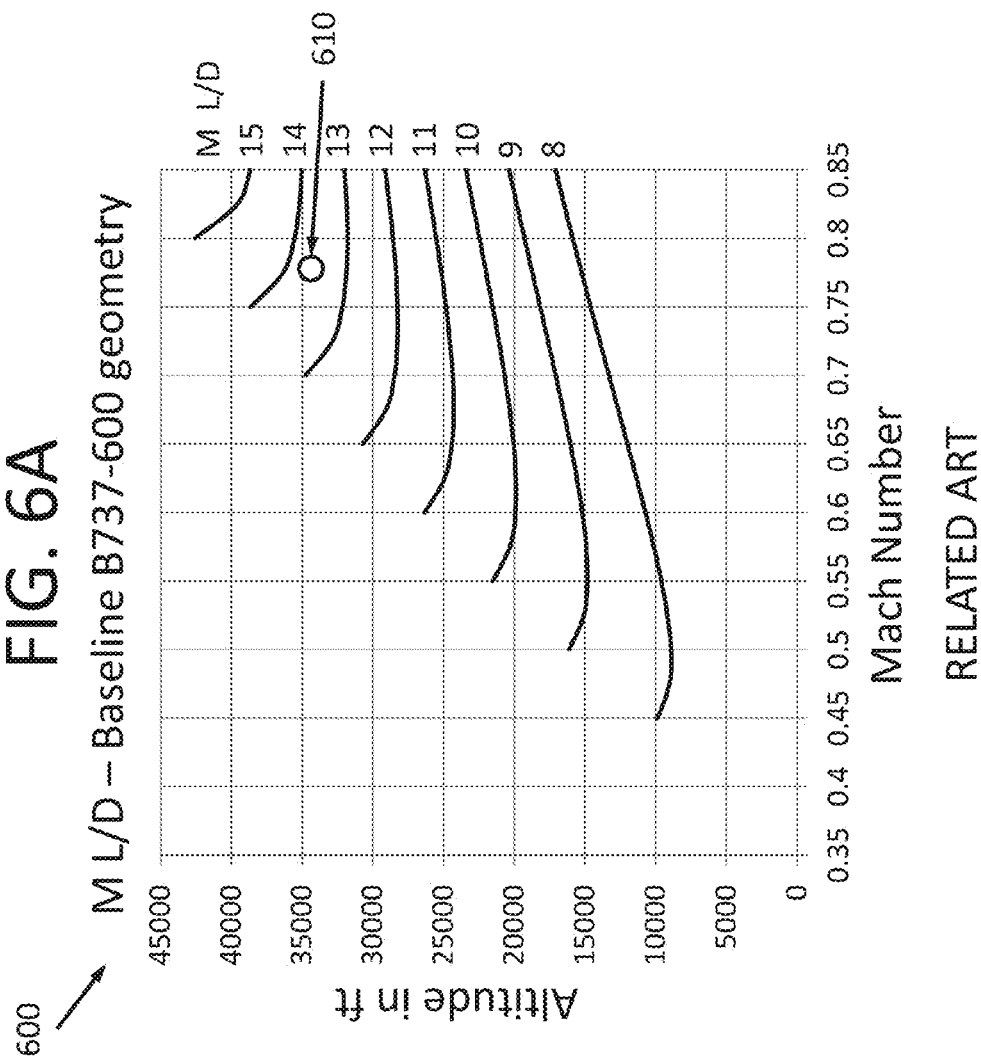

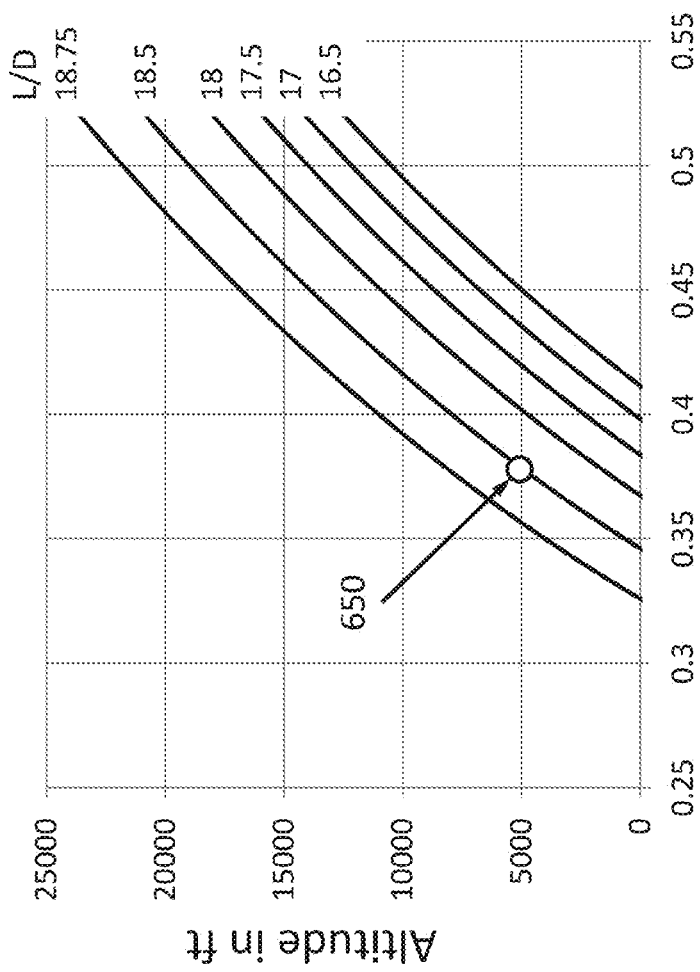

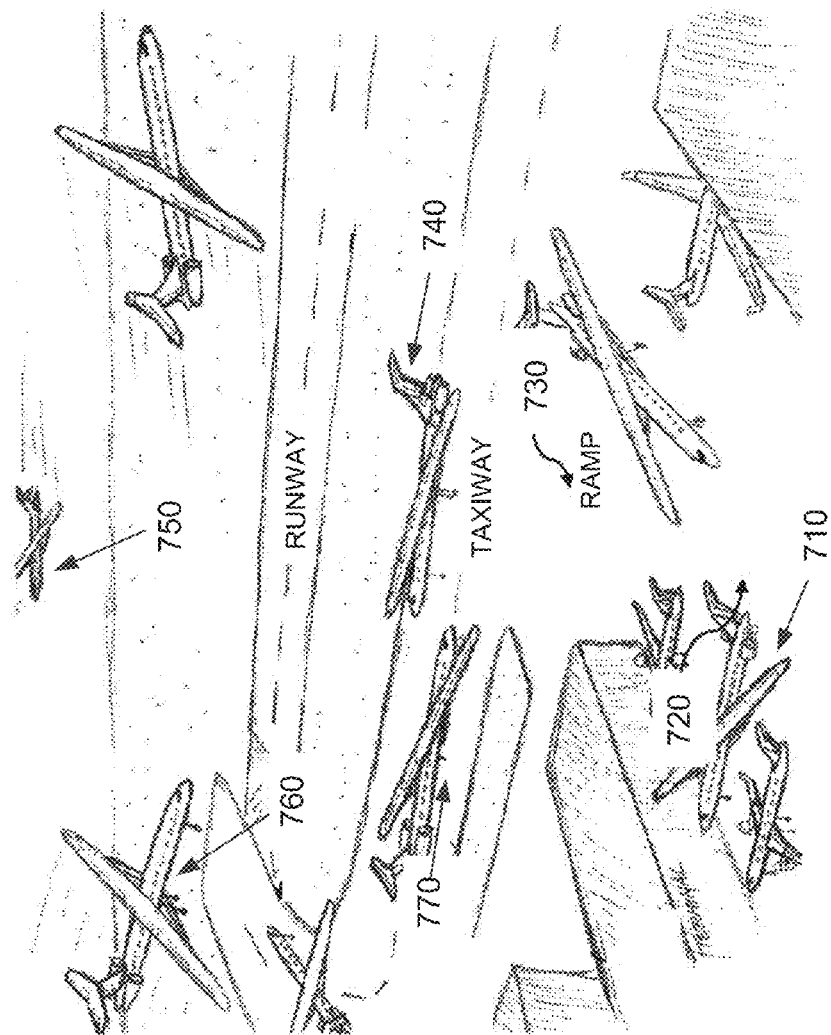

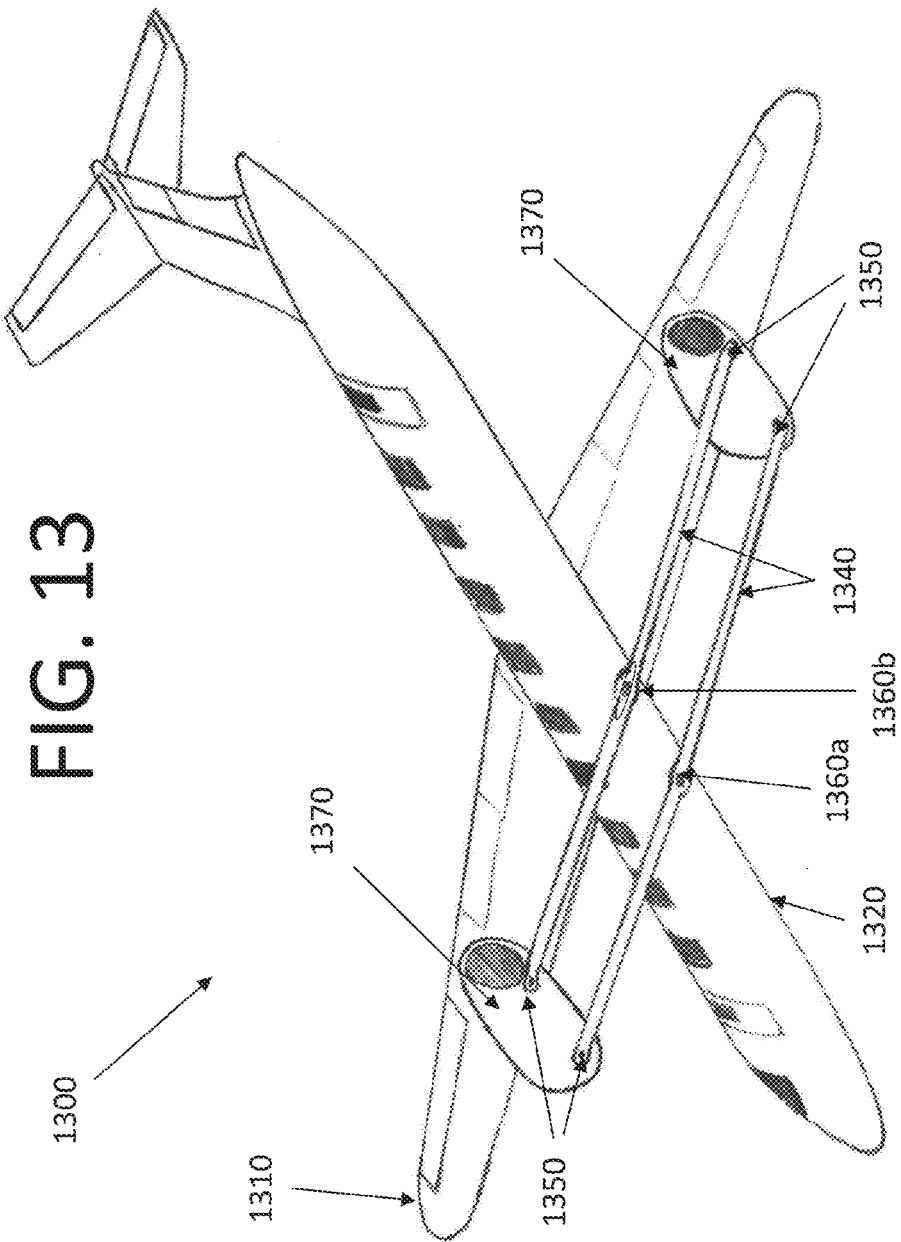

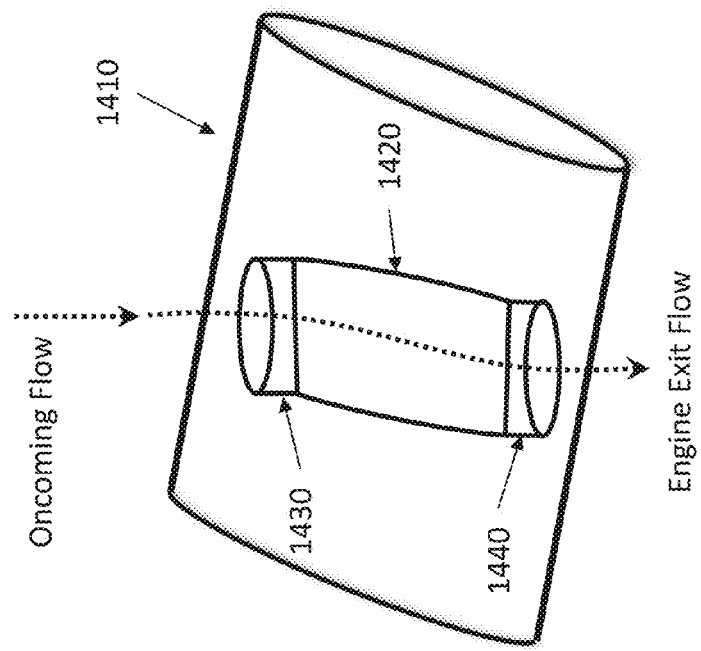
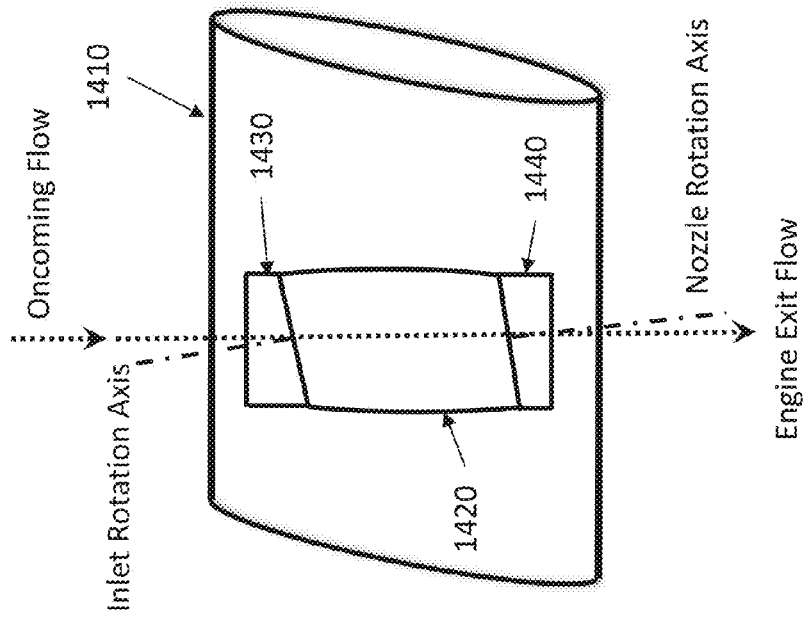

VARIABLE GEOMETRY AIRCRAFT WING SUPPORTED BY STRUTS AND/OR TRUSSES

CROSS REFERENCE TO RELATED APPLICATION

This application is a non-provisional of, and claims priority to, U.S. Provisional Patent Application Ser. No. 61/764,797 filed Feb. 14, 2013. The subject matter of the provisional application is hereby incorporated by reference in its entirety.

ORIGIN OF THE INVENTION

The invention described herein was made by (an) employee(s) of the United States Government and may be manufactured and used by or for the Government of the United States of America for governmental purposes without the payment of any royalties thereon or therefor.

FIELD OF THE INVENTION

The present invention generally pertains to aircraft wing configurations, and more specifically, to support structures for a rotatable oblique aircraft wing.

BACKGROUND

The optimal wing sweep for flight of an aircraft varies based on speed. For instance, it is generally preferable to have a wing with little or no sweep at takeoff speeds, but such a wing performs poorly as speed increases towards supersonic speeds. In order to modify wing sweep, some aircraft, such as the F-14, F-111, and B-1B, employ a swing wing design where each wing is capable of pivoting such that the wings are symmetrically swept back.

However, an oblique wing may also be employed to modify wing sweep. An oblique wing is a single wing with a center pivot where one side sweeps forward and the other side sweeps backward. Such a wing is shown in the NASA AD-1 aircraft 100 of FIG. 1. U.S. Pat. No. 3,971,535, assigned to NASA, describes an oblique-wing supersonic aircraft. The contents of U.S. Pat. No. 3,971,535 are hereby incorporated by reference in their entirety.

However, conventional oblique wing designs do not resist transverse bending, and are not sufficiently strong or stable for practical applications. Accordingly, an improved oblique wing design is needed.

SUMMARY OF THE INVENTION

Certain embodiments of the present invention may be implemented and provide solutions to the problems and needs in the art that have not yet been fully solved by conventional oblique aircraft wings. For example, in some embodiments, an oblique variable-sweep wing is braced by struts and/or trusses in order to increase strength and stability. Such embodiments may (1) improve aerodynamic performance during low speed flight shortly after takeoff without a penalty to high speed flight aerodynamic performance; (2) reduce airport runway length requirements through improved low speed aerodynamic performance (i.e., increased lift); (3) reduce takeoff noise due to lower engine power requirements to achieve flight; and (4) reduce the aircraft spotting factor (i.e., the size footprint of the aircraft) during taxi and gate operations with a minimum impact upon aircraft structural weight since the oblique wing can pivot.

In accordance with one aspect of the present invention, there is provided an aircraft having variable airframe geometry for accommodating efficient flight. The aircraft includes an elongated fuselage, an oblique wing pivotally connected with the fuselage, a wing pivoting mechanism connected with the oblique wing and the fuselage, and a brace operably connected between the oblique wing and the fuselage. The brace may include at least one of a strut or truss. Also, there includes a rotating joint between the brace and the fuselage and includes a joint between the brace and the oblique wing.

The wing pivoting mechanism may be a mechanical, electrical, hydraulic, or similar motor or actuator. The wing pivoting mechanism rotates the oblique wing and the brace relative to the fuselage such that one end of the oblique wing is closer to the front of the aircraft and another end of the oblique wing is closer to the rear of the aircraft during high speed flight. Also, the wing pivoting mechanism rotates the oblique wing and the brace such that the oblique wing is generally perpendicular to the fuselage during low speed flight.

The brace may include first and second parallel braces operably connected between the oblique wing and the fuselage. The first and second parallel braces may include a rotating and/or sliding joint between the fuselage and the first and/or second parallel braces. Also, the first and second parallel braces may include a rotating and/or sliding joint between the oblique wing and the first and/or second parallel braces.

In accordance with another aspect of the present invention, there is provided an aircraft having variable airframe geometry for accommodating efficient flight. The aircraft includes an elongated fuselage, an oblique wing pivotally connected with the fuselage, a wing pivoting mechanism connected with the oblique wing and the fuselage, a propulsion system pivotally connected with the oblique wing, and a brace operably connected between the propulsion system and the fuselage. The brace may include at least one of a strut or truss. Also, there includes a rotating joint between the brace and the fuselage and a rotating joint between the brace and the propulsion system.

The wing pivoting mechanism may be a mechanical, electrical, hydraulic, or similar motor or actuator. The wing pivoting mechanism rotates the oblique wing and the brace relative to the fuselage such that one end of the oblique wing is closer to the front of the aircraft and another end of the oblique wing is closer to the rear of the aircraft during high speed flight and such that the longitudinal axis of the propulsion system remains generally parallel to the longitudinal axis of the fuselage. The wing pivoting mechanism also rotates the oblique wing and the brace such that the oblique wing is generally perpendicular to the fuselage during low speed flight and such that the longitudinal axis of the propulsion system remains generally parallel to the longitudinal axis of the fuselage.

The brace may include first and second parallel braces operably connected between the propulsion system and the fuselage. The first and second parallel braces may include a rotating and/or sliding joint between the fuselage and the first and/or second parallel braces and a rotating joint between the propulsion system and the first and/or second parallel braces.

In accordance with a further aspect of the present invention, there is provided an aircraft having variable airframe geometry for accommodating efficient flight. The aircraft includes an elongated fuselage, an oblique wing pivotally connected with the fuselage, a wing pivoting mechanism connected with the oblique wing and the fuselage, and a propulsion system rigidly connected with the oblique wing.

The propulsion system may include an engine, a rotating inlet, and a rotating nozzle. The aircraft also includes a brace operably connected between the propulsion system and the fuselage, a rotating joint between the brace and the fuselage, and a fixed joint between the brace and the propulsion system. The wing pivoting mechanism rotates the oblique wing and the brace relative to the fuselage such that one end of the oblique wing is closer to the front of the aircraft and another end of the oblique wing is closer to the rear of the aircraft during high speed flight and such that the oblique wing is generally perpendicular to the fuselage during low speed flight. The longitudinal axis of the propulsion system remains generally perpendicular to the oblique wing, while the rotating inlet moves to redirect oncoming air flow in the engine and the rotating nozzle move to redirect engine exhaust flow generally aft of the engine.

In a related aspect, a brace of the present invention is configured to rotate about its longitudinal axis such that the leading edge of the brace generally faces the relative wind as the oblique wing and the brace rotate relevant to the fuselage.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 6A is a graph illustrating Aerodynamic Performance Efficiency M(L/D) for a baseline 737-600 geometry.

FIG. 6C is a graph illustrating the Lift-to-Drag Ratio L/D for a baseline 737-600 geometry.

FIG. 7 illustrates an operational schematic of an airport with oblique winged aircraft, according to an embodiment of the present invention.

FIG. 13 is a perspective view illustrating another alternative braced oblique wing aircraft, according to an embodiment of the present invention.

FIG. 14A illustrates an embodiment of the present invention showing an engine aligned with oncoming air flow when the wing is unswept.

FIG. 14B illustrates the embodiment of FIG. 14A showing the engine not aligned with oncoming air flow when the wing is swept.

DETAILED DESCRIPTION OF THE EMBODIMENTS

Some embodiments of the present invention pertain to a strut and/or truss braced configuration for an oblique wing. In some embodiments, the brace (strut and/or truss) is a load carrying structure that is either a single element strut or a more complex multi-element truss. As used herein, the term "brace" is an all-inclusive term that covers all suitable forms of load transmitting structures, of which struts and trusses are examples. In certain embodiments, an aircraft utilizes a strut and/or truss-braced, continuous span wing, where the wing is attached to the fuselage with a mechanical pivot, and the sweep of the wing may be adjusted in-flight to maximize aircraft performance and efficiency on adjusted on the ground to minimize aircraft spotting factor.

In some embodiments, the only essential differential motion that occurs is between the wing and fuselage. In some such embodiments, the wing, braces, and any wing mounted engines may move together as a single unit with no differential motion between the components. This would generally be the mechanically simplest and most structurally efficient approach. The strut airfoil shapes may be tailored for near optimized cruise drag with an acceptable penalty for low speed operations where the strut profile drag is a relatively small increment.

Figure 1:
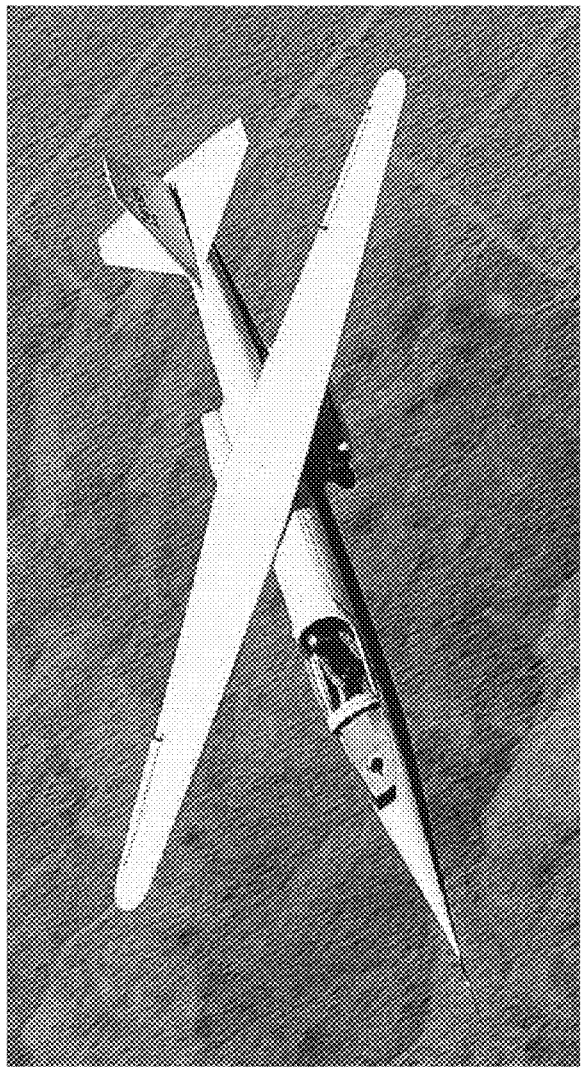
FIG. 1 illustrates the NASA AD-1 oblique winged aircraft.

Unlike a "switchblade" wing, where the overall wing comprises three or more major assemblies, two outboard semi-span wing panels and a centerbody, the "oblique" variable sweep continuous span wing features a continuous load bearing transverse structure. When "switchblade" wings are rotated about their respective pivot points to enable variable sweep, the overall aerodynamic shape has lateral symmetry. When the continuous span wing is rotated about its pivot to produce sweep, the overall aerodynamic shape lacks lateral symmetry. In other words, one side of the oblique wing rotates towards the front of the aircraft and the other side of the oblique wing rotates towards the back of the aircraft. See FIG. 1.

Figure 2:
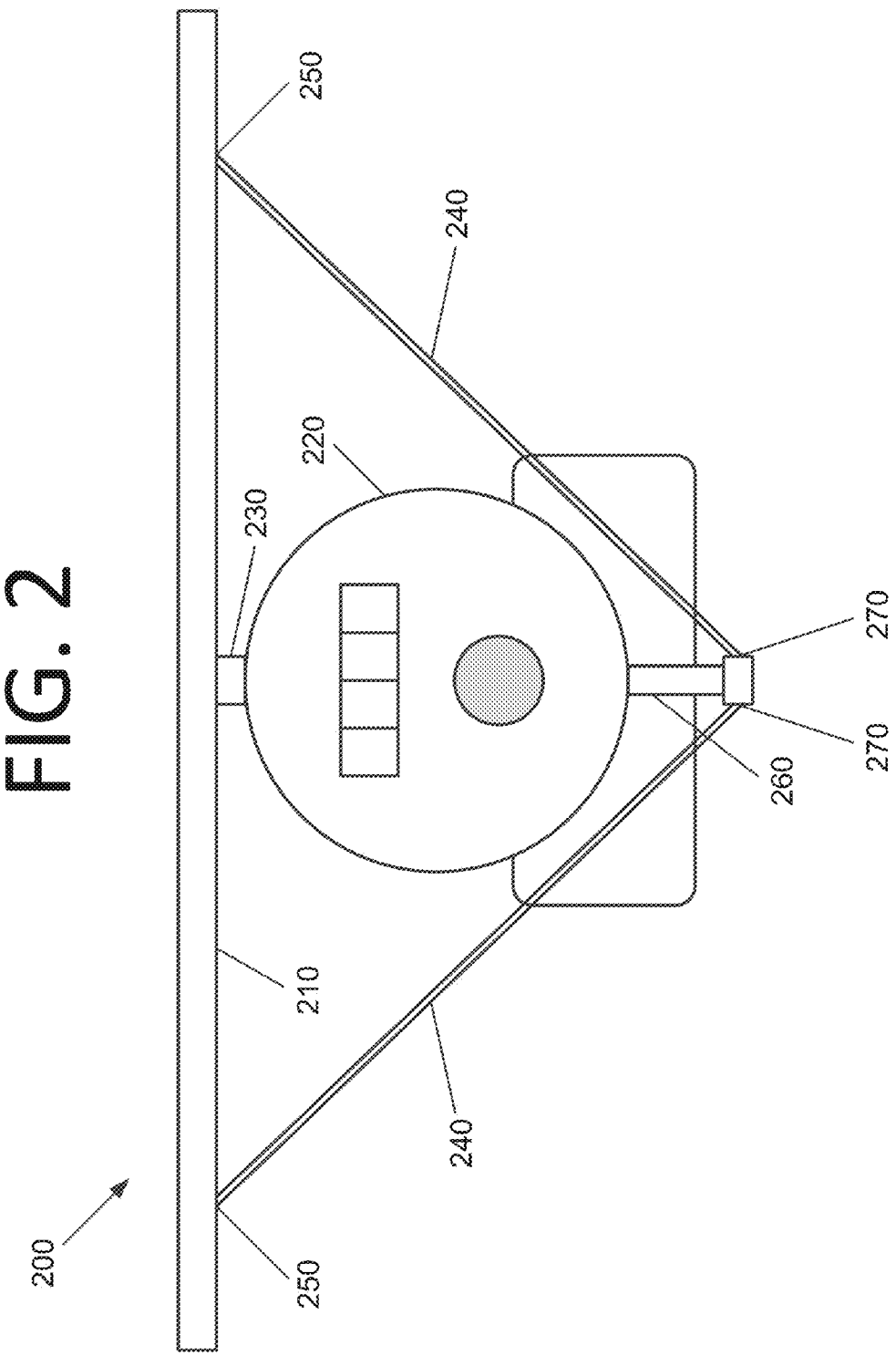
FIG. 2 illustrates an aircraft with a top-mounted wing rotatably mounted above the fuselage of the aircraft, according to an embodiment of the present invention.

FIG. 2 illustrates an aircraft 200 with a top-mounted wing rotatably mounted above the fuselage of aircraft 200, according to an embodiment of the present invention. An oblique wing 210 is rotatably mounted above a conventional aircraft fuselage 220 using a pivot 230. A pair of braces 240 is mechanically affixed to wing 210 at junction 250 and to fuselage 220 at pivot 260. Braces 240 are also affixed to pivot 260 via junction 270. Junctions 250, 270 may be configured to enable braces 240 to move as wing 210 rotates about pivot 230. In order to enable such movement, junctions 250, 270 may include ball joints or any other configuration that enables movement of braces 240 relative to wing 210. It should also be appreciated that as a matter of design choice, junctions 250 and 270 may be fixed and any desired number of braces may be used.

Figure 3:
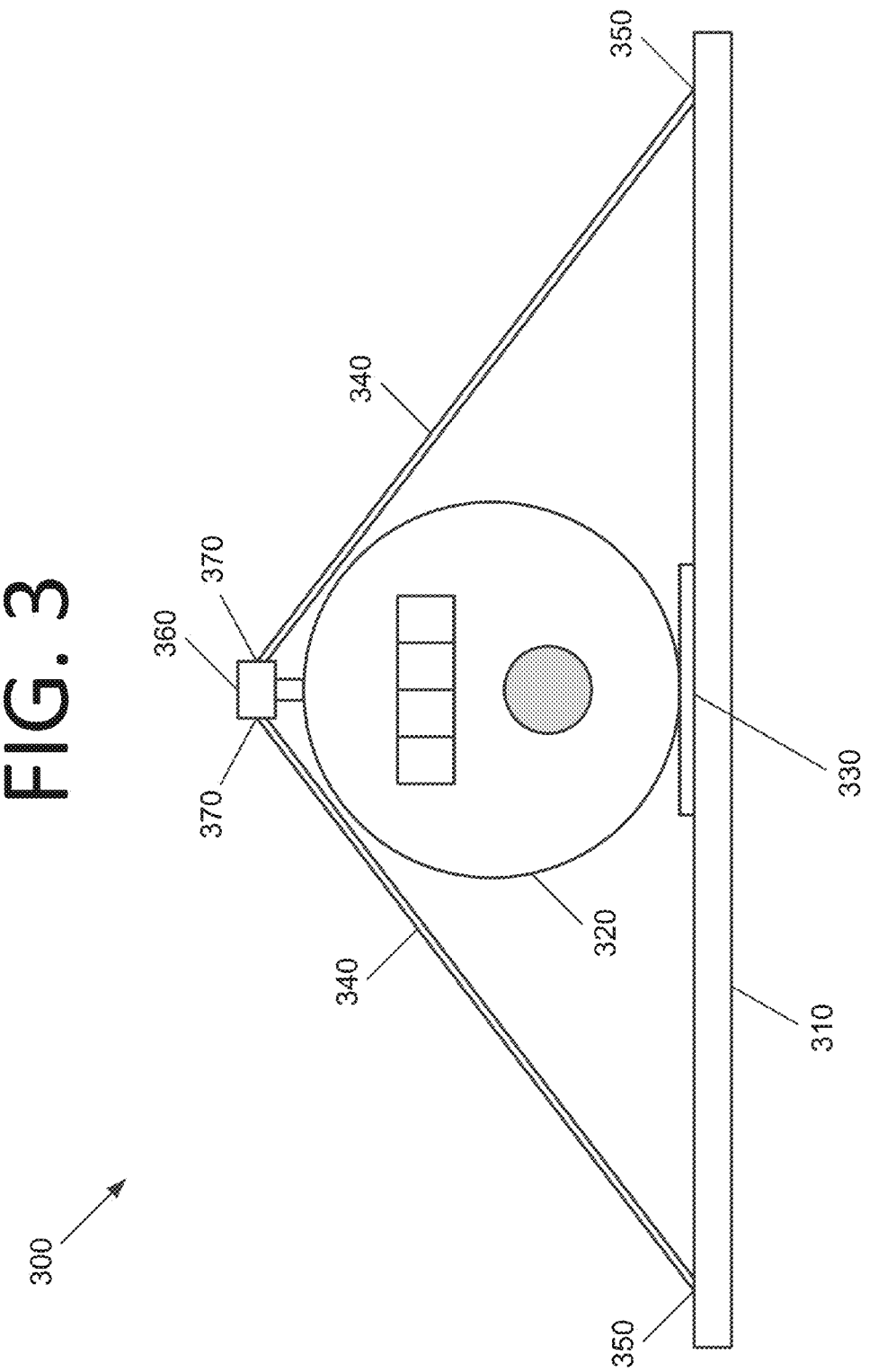
FIG. 3 illustrates an aircraft with a bottom-mounted wing rotatably mounted below the fuselage of the aircraft, according to an embodiment of the present invention.

FIG. 3 illustrates an aircraft 300 with a bottom-mounted wing rotatably mounted below the fuselage of aircraft 300, according to an embodiment of the present invention. An oblique wing 310 is rotatably mounted below a conventional aircraft fuselage 320 using a pivot 330. A pair of braces 340 is mechanically affixed to wing 310 at junction 350 and to fuselage 320 at pivot 360. Braces 340 are also affixed to pivot 360 via junction 370. Junctions 350, 370 may be configured to enable braces 340 to move as wing 310 rotates about pivot 330. In order to enable such movement, junctions 350, 370 may include ball joints or any other configuration that enables movement of braces 340. It should also be appreciated that any desired number of braces may be used as a matter of design choice.

One of ordinary skill in the art will readily appreciate that the features shown in FIGS. 2 and 3 are not necessarily drawn to scale. Also, while top-mounted and bottom-mounted wing configurations are shown in FIGS. 2 and 3, it should be appreciated that center-mounted embodiments are also possible, where the wing is mounted within the fuselage of the aircraft. Such embodiments may have struts mounted above and/or below the aircraft fuselage. Certain embodiment may include a truss in addition to or in lieu of these struts.

The wing structure should resist transverse bending moments, which are greater at the centerline of the wing than at the tip. In a high wing design, the braces are configured to carry, in tension, forces that would be otherwise expressed as bending moment. The pivot that positions the wing above or below the fuselage may carry the weight of the fuselage, but need not necessarily resist wing transverse bending moments. On a "switchblade" variable sweep wing, each pivot must carry the weight of the rest of aircraft and resist wing transverse bending moments.

Figure 4:
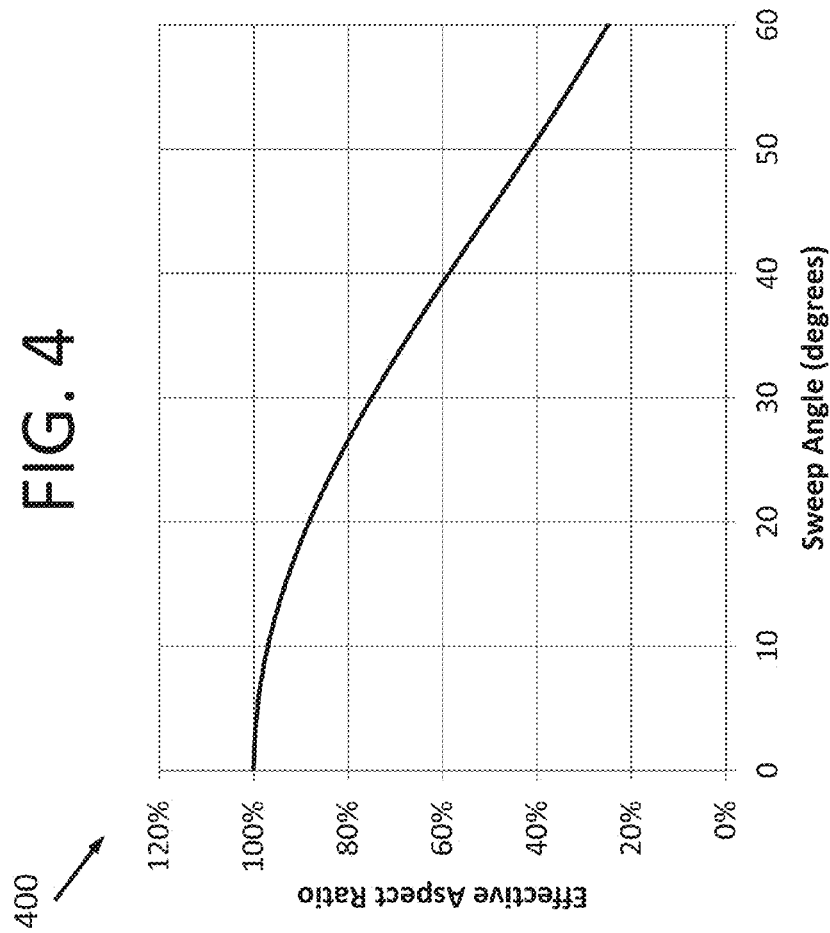
FIG. 4 is a graph plotting sweep angle versus effective aspect ratio.
Figure 5:
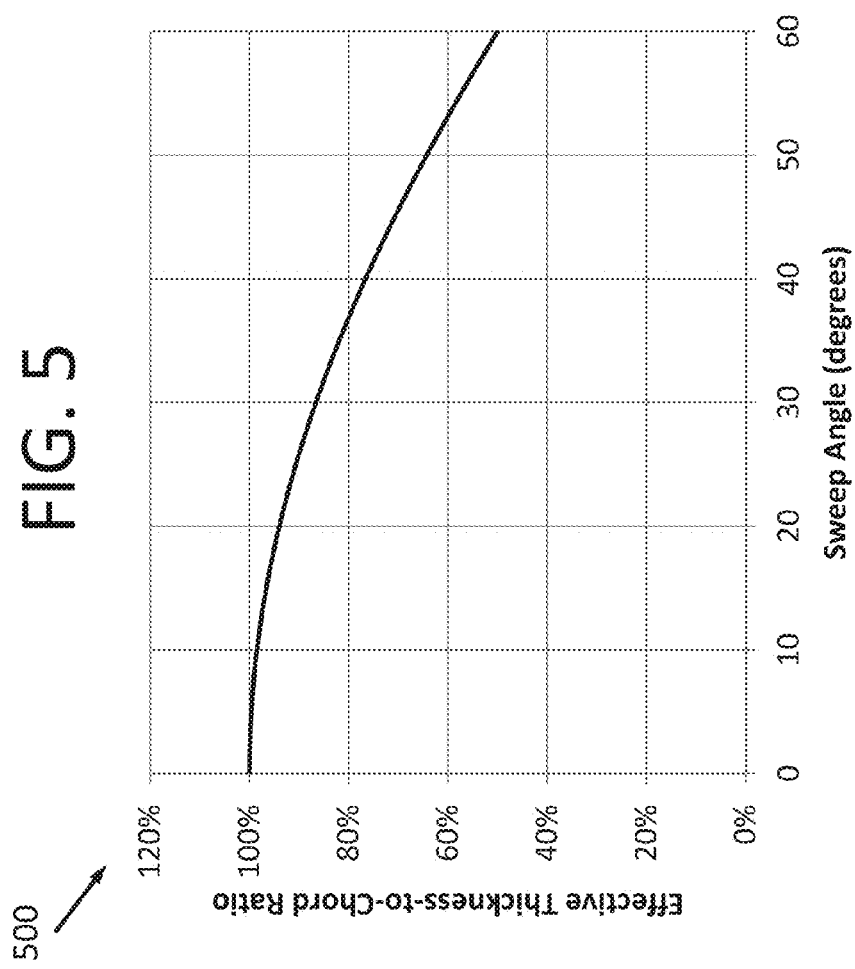
FIG. 5 is a graph plotting sweep angle versus effective thickness-to-chord ratio.

As the oblique wing is swept about its pivot point, its effective geometric and aerodynamic characteristics change. As the wing is swept from its laterally symmetric "unswept" configuration (i.e., perpendicular to the fuselage), its effective wingspan perpendicular to the airflow varies proportionally to the cosine of the sweep angle. The wing area remains constant. Therefore, the aspect ratio of the wing varies proportionally to the square of the cosine of the sweep angle. See graph 400 of FIG. 4. In the reference frame of flight airflow, the wing chord increases inversely proportionally to the cosine of the sweep angle. Thus, the thickness-to-chord ratio of the wing, in the reference frame of flight airflow, scales inversely proportionally to the cosine of the sweep angle. See graph 500 of FIG. 5, where effective thickness-to-chord is given by the percent of the thickness-to-chord normal to the leading edge. The combination of reduction in aerodynamic thickness and increase in leading edge sweep increases the drag divergence speed of the wing. By reducing the bending moments resisted by the pivot, some embodiments also reduce the structural weight necessary for the pivot to resist these wing bending moments. The pivot structural weight for un-braced variable sweep wing configurations has been an impediment to producing a viable oblique wing aircraft with the performance benefits enabled by such embodiments.

Airplane wing design balances competing aerodynamic and structural requirements. Viscous "skin friction" forces make up a significant fraction of overall airframe drag. These forces largely scale linearly with wetted area, which is the total surface area of all parts of the aircraft in contact with the surrounding air. For a constant sweep angle, an increase in the drag divergence speed of the wing requires the wing to be made proportionally thinner (lowering its thickness-to-chord ratio). To resist aerodynamic loads and bending moments, the wing structure should exceed a minimum structural mass-moment-of-inertia. For a monocoque structure, the mass-moment-of-inertia is proportional to the cube of the overall thickness of the aerodynamic wing, and approximately linearly proportional to the thickness of the wing skins. For a wing spar, the mass-moment-of-inertia is proportional to the cube of the overall thickness of the aerodynamic wing. On a conventional, monoplane design, the structural thickness of the wing is governed by its aerodynamic shape.

Use of an external brace (strut and/or truss) allows for reduction of the structural weight of the wing because the presence of struts and/or trusses effectively decouples the aerodynamic thickness of the wing from its structural thickness. The vertical separation between the main wing and the brace increases its equivalent structural thickness. The novel inclusion of struts and/or trusses bracing a pivoting, variable-sweep oblique wing greatly reduces the structural penalties previously associated with unbraced oblique wing configurations while maintaining the oblique wing's improved aerodynamic performance.

Following the mathematics contained in FLOPS sizing code (see *Aircraft Configuration Optimization Including Optimized Flight Profiles, Multidisciplinary Analysis and Optimization—Part* 1, L. A. McCullers, NASA CP-2327, 1984), an oblique, variable sweep, braced wing should weigh approximately 30% less than a fixed geometry wing of an equivalent configuration. Thus, if an airframe otherwise equivalent to a Boeing 737-600 is built employing this technology, it could either use some embodiments of the present invention to save weight, enable a wing of greater overall span to be built at an equivalent weight, or increasing span by a lesser amount while also reducing weight.

Following the FLOPS formulation, if the oblique strut and/or truss-braced wing is designed for cruise performance at 30 degrees of wing sweep and takeoff performance at 0 degrees of wing sweep, the oblique strut and/or truss-based wing can have a wing span 35% wider than the equivalent baseline wing (1.85 times the aspect ratio, holding wing planform area constant) with no net weight penalty. Aerodynamic performance estimates are shown in FIGS. 6A-D. The aerodynamic lift-to-drag ratio (L/D) is estimated using the classical formulation L/D=CL/CD, where $CD=CD0+k*CL^2$, $k=1/(\pi AR\ e)$ and the span efficiency factor e~1. L is lift, D is drag, CL is the coefficient of lift, CD is the coefficient of drag, CD0 is the drag coefficient at zero lift, and AR is the aspect ratio. Similarly, the aerodynamic performance efficiency, M(L/D), is derived by multiplying the lift-to-drag ratio by the flight Mach number M.

A Boeing 737 has parameters CD0~0.0200, AR~10.2, and a drag divergence speed of approximately Mach 0.78. The classical equation is valid for all flight speeds beneath the drag divergence speed. The equivalent oblique, pivoting, strut and/or truss-braced wing aircraft has parameters CD0~0.0220 (including a pessimistic accounting for the additional wetted area and interference drag of the strut), AR~19.1 with the wing in the unswept takeoff position, and AR~14.3 with the wing swept for high speed cruise at approximately Mach 0.78.

Figure 6B:
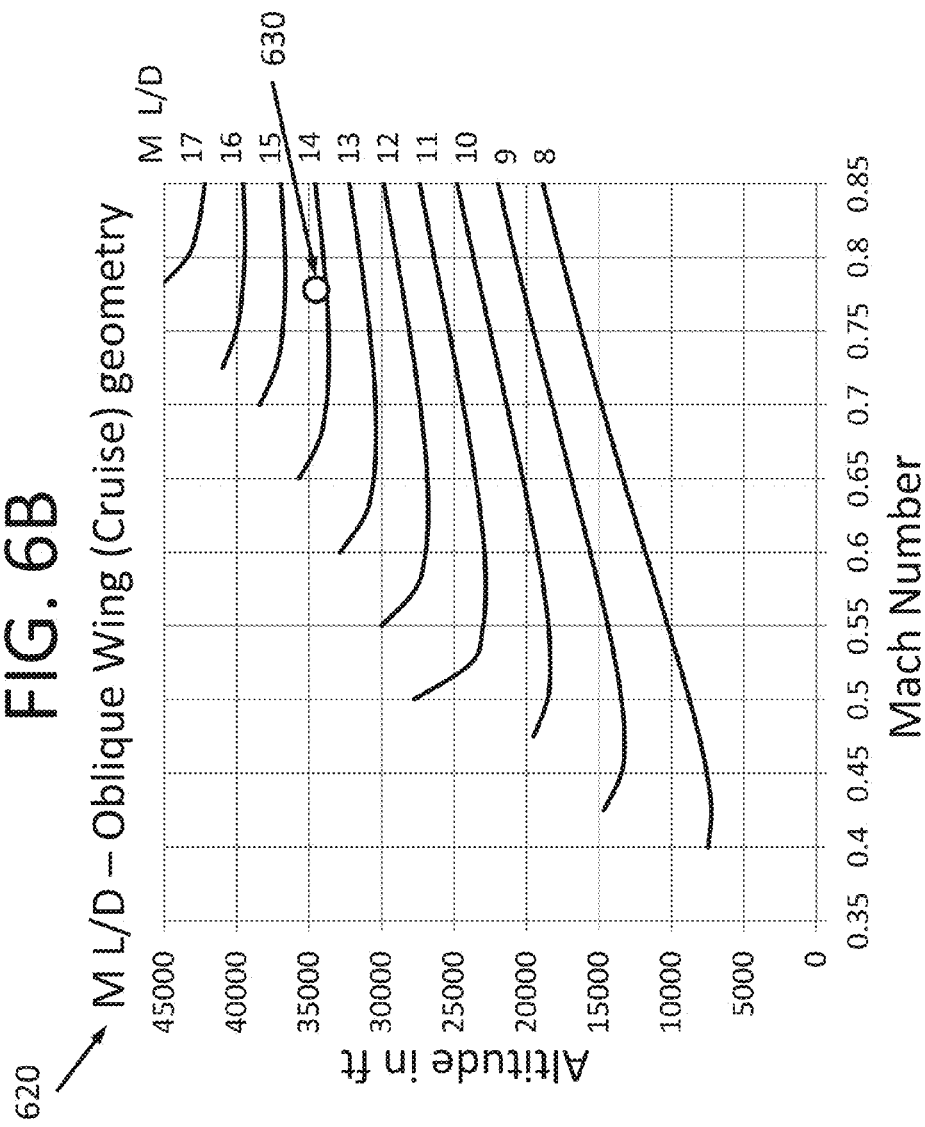
FIG. 6B is a graph illustrating Aerodynamic Performance Efficiency M(L/D) for an oblique wing cruise geometry, according to an embodiment of the present invention.

The high speed cruise aerodynamic performance efficiency is compared in graphs 600 and 620 of FIGS. 6A and 6B. The peak aerodynamic performance efficiency, M(L/D)$_{max}$, for each configuration occurs at the high speed cruise point (M~0.78). For the baseline Boeing 737-600, this value is estimated to be M(L/D)$_{max}$~13.6. See 610 in FIG. 6A. For the oblique, pivoting, strut or truss-braced wing version of the airframe, this value is estimated to be M(L/D)$_{max}$~14.2. See 630 in FIG. 6B. This is a 4% improvement in aerodynamic cruise efficiency. The specific range of an aircraft is linearly proportional to its aerodynamic performance efficiency. Therefore, this revised wing can increase fuel efficiency and reduce carbon emissions by at least 4%.

Figure 6D:
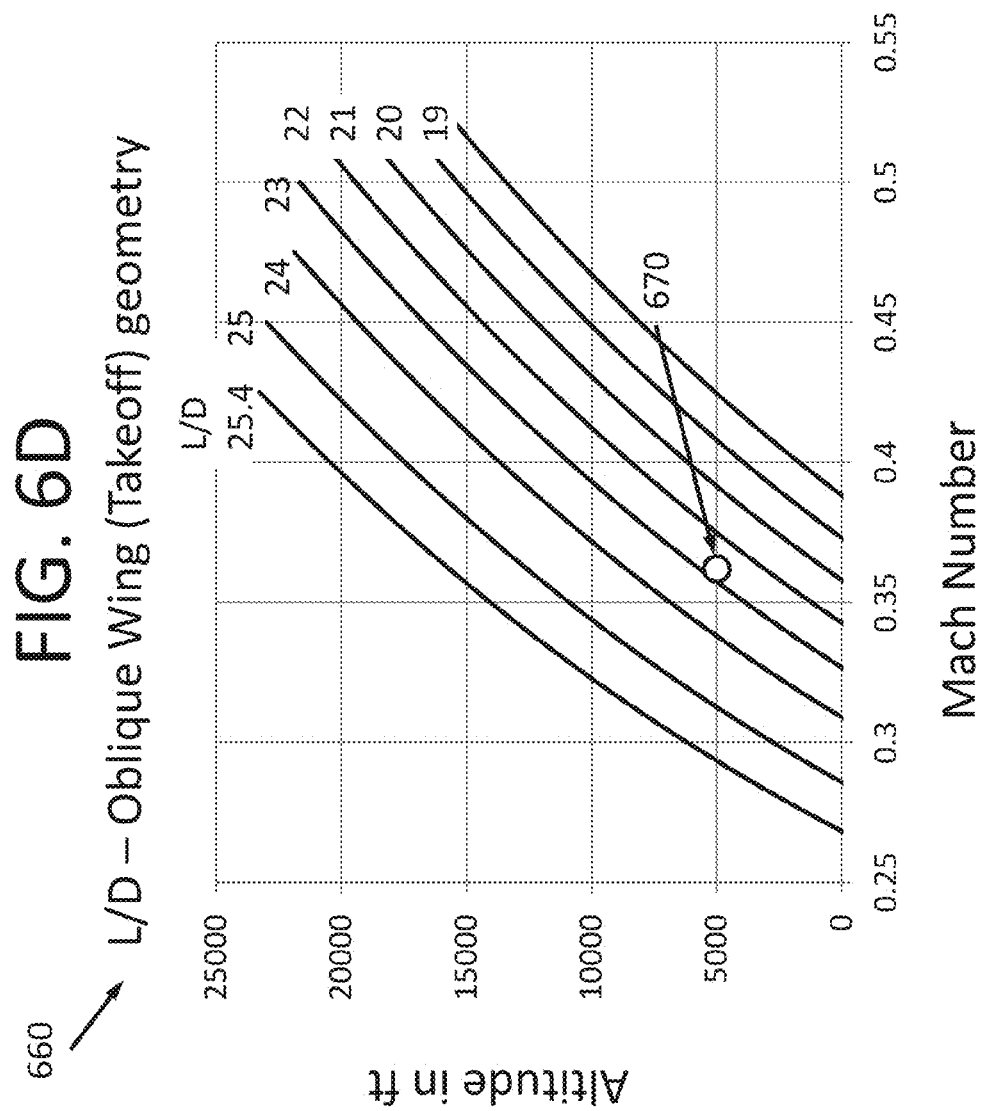
FIG. 6D is a graph illustrating the Lift-to-Drag Ratio L/D for an oblique wing takeoff geometry, according to an embodiment of the present invention.

The low speed aerodynamic efficiency is compared in graphs 640 and 660 of FIGS. 6C and 6D. These graphs contrast the aerodynamic efficiency, (L/D), for each configuration in low speed, M~0.38, low altitude, ALT~5000 feet flight. For the baseline Boeing 737-600, this value is estimated to be (L/D)~18.5. See 650 of FIG. 6C. For the oblique, pivoting, strut and/or truss-braced wing version of the airframe, this value is estimated to be (L/D)~22. See 670 of FIG. 6D. This is a 19% improvement in aerodynamic efficiency during fourth segment takeoff. In addition, the unswept wing has an inherently higher maximum lift coefficient, CLmax, resulting in a lower stall speed. Thus, to maintain an equivalent takeoff stall speed, the oblique, pivoting wing generally requires a smaller, lower drag flap. The takeoff flaps can be refracted earlier in flight and at a lower speed, further reducing drag.

For an airframe with equivalent propulsion, any reduction in drag during takeoff climb increases the rate-of-climb. Because the ground level noise of an overflying aircraft is linearly proportional to its thrust and inversely proportional to the square of its altitude, a steeper takeoff climb will help shrink the airport noise footprint. Similarly, the ground level emissions of an aircraft are linearly proportional to its thrust level and inversely proportional to the time the aircraft is at low altitude. Because an increase in climb performance will reduce the time the aircraft is at low altitude, an oblique, strut and/or truss-braced wing will help the aircraft shrink its airport emissions footprint.

The oblique, strut and/or truss-braced wing of some embodiments provides the aircraft with an efficient cruise speed when the wing is swept, and low speed performance (improved climb efficiency) when the wing is unswept. This wide speed envelope provides future air traffic systems with additional flexibility when scheduling efficient arrivals and departures. The improved climb performance reduces the noise footprint of the aircraft as it departs the airport neighborhood. Where aircraft are required to fly lower and slower than the speed/altitude pairing that maximizes aerodynamic performance efficiency due to air traffic control constraints, the increase in L/D enabled by the unswept wing (compare 650 of FIG. 6C with 670 of FIG. 6D) enables the novel configurations of some embodiments to burn less fuel and emit less pollution than the baseline conventional configuration.

FIG. 7 illustrates an operational schematic of an airport 700 with oblique winged aircraft, according to an embodiment of the present invention. In this scenario, when an aircraft is parked at the gate, the wing is pivoted to a large sweep angle. This will greatly reduce the aircraft's physical wingspan and minimize the aircraft spotting factor (i.e., the amount of space occupied by the aircraft). If the 160 foot wing of the embodiment of the 737-600 discussed above were swept to 60 degrees, its tip-to-tip span would be halved to 80 feet. This feature permits the aircraft to use gates configured for a smaller airplane 710. The swept wing also allows the aircraft to easily maneuver within terminal/ramp area 720. The wing could remain swept during taxi, reducing the chance of collisions with other taxiing aircraft 730. During the run-up/checkout before takeoff, the wing would be rotated to the unswept position perpendicular to the fuselage 740.

In flight, the increased low speed aerodynamic efficiency from the unswept wing will reduce takeoff distances and increase low speed climb performance. Once airborne, the wing would pivot to the sweep angle appropriate for flight at a proscribed speed. During high speed cruise, the wing will be swept for optimum aerodynamic performance efficiency 750.

During descent and approach, the wing would again be rotated back to its unswept position in order to improve the aircraft's low speed performance for landing 760. Approach and landing speeds could be greatly reduced. As the aircraft departs the runway for the taxiway, the wing would be rotated again to align with the fuselage 770, greatly reducing the possibility of collisions during taxiing and improving gate access.

The configuration lends itself to integration on a conventional fuselage including a substantial constant cross-section length. This aircraft configuration lends itself well to economical manufacture and adaptation to suit individual customers and markets. The constant cross-section fuselage could be easily lengthened or shortened to meet expected passenger demand while retaining many common elements of the wing and strut and/or truss bracing.

Figure 8:
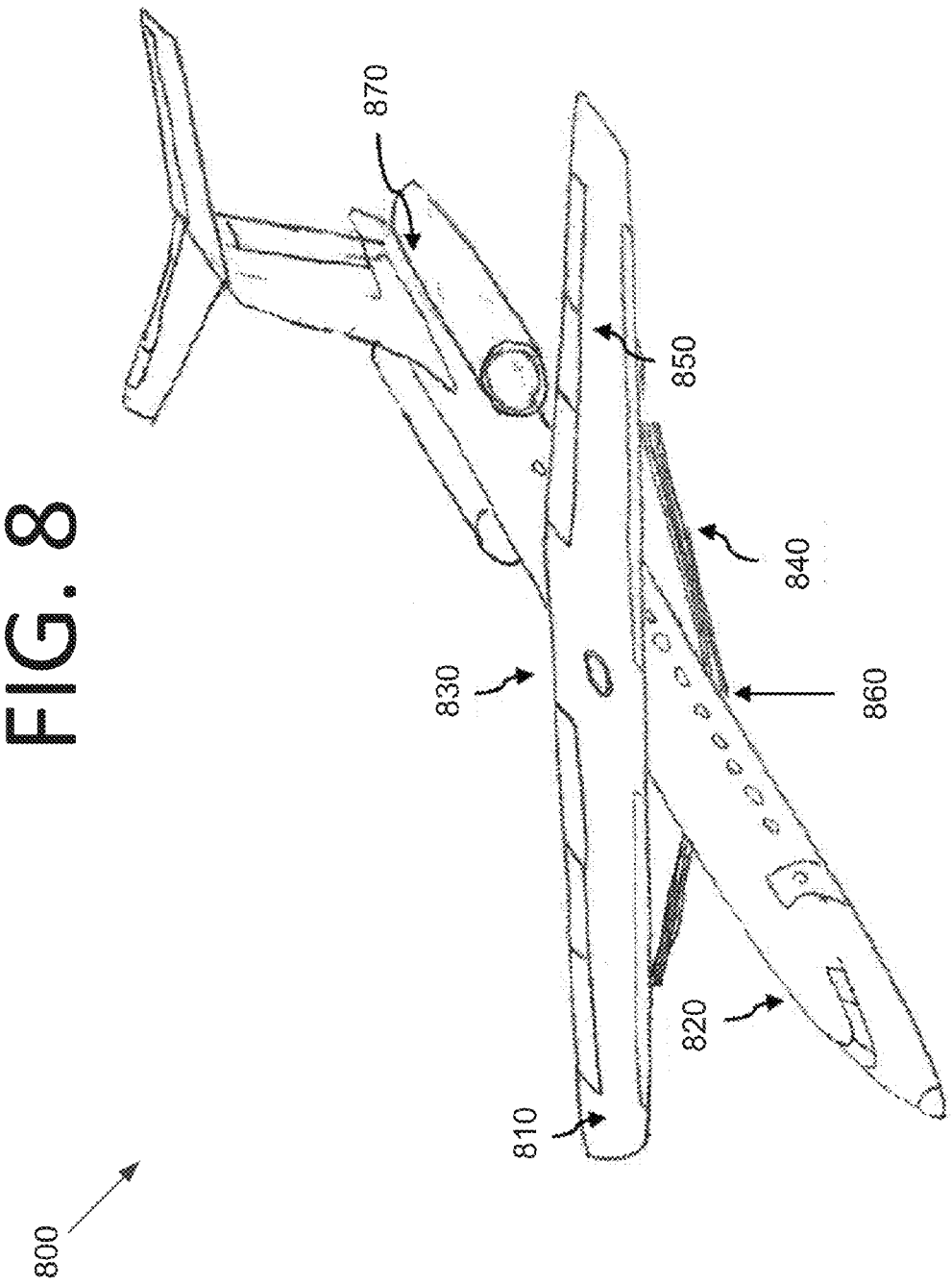
FIG. 8 is a perspective view illustrating a braced oblique wing aircraft, according to an embodiment of the present invention.

FIG. 8 is a perspective view illustrating a strut-braced oblique wing aircraft 800, according to an embodiment of the present invention. Aircraft 800 includes a continuous span wing 810, where wing 810 is attached to fuselage 820 with a mechanical pivot 830, one or more braces that reduce wing root bending moments 840, associated brace-to-wing junctions 850, and one or more brace-to-fuselage mechanical pivots 860. The sweep of wing 810 may be adjusted in-flight to maximize aircraft performance and efficiency and adjusted on the ground to minimize aircraft spotting factor. In this embodiment, a propulsion system 870, such as an engine, is mounted on fuselage 820 of aircraft 800.

Figure 9:
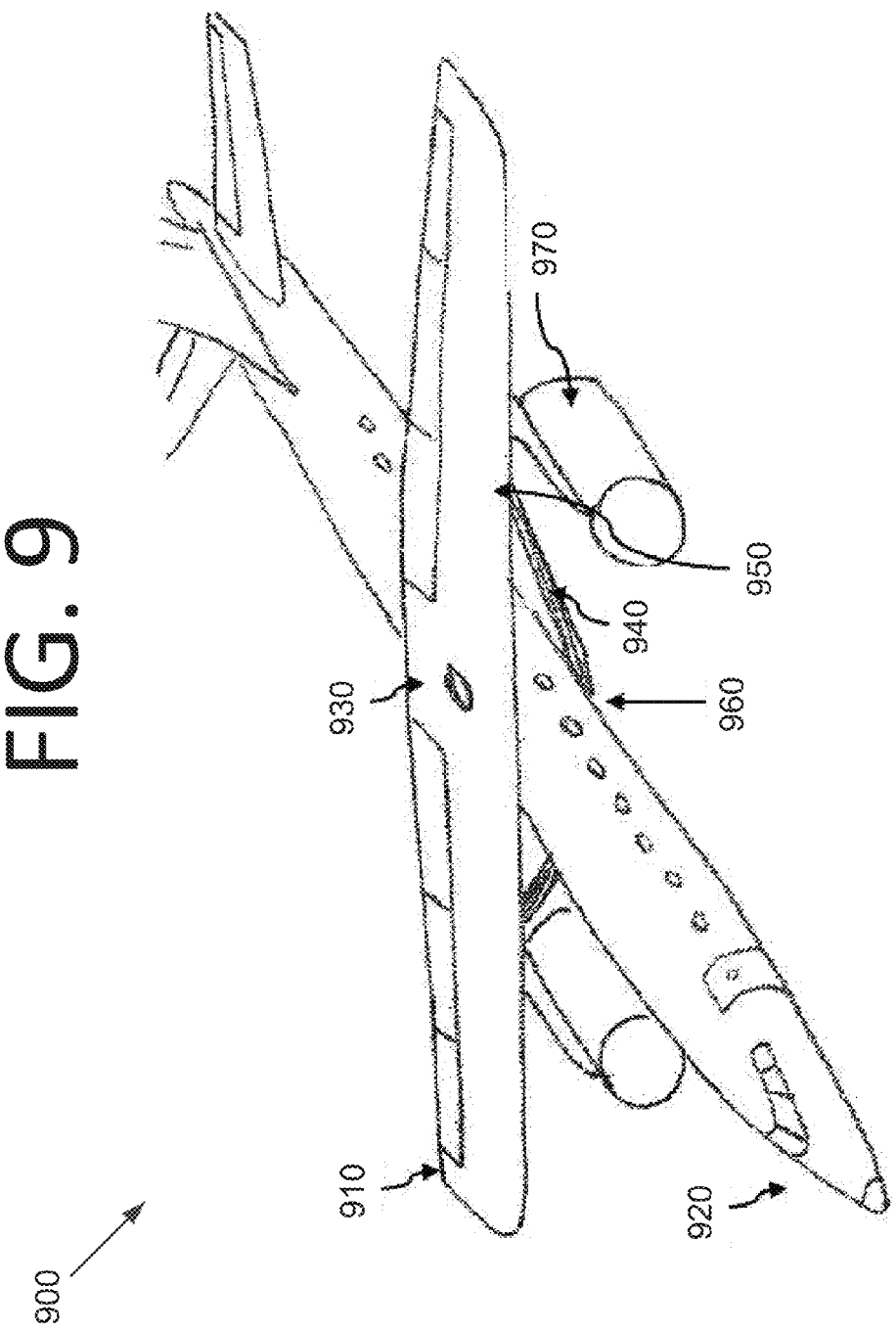
FIG. 9 is a perspective view illustrating another braced oblique wing aircraft, according to an embodiment of the present invention.

FIG. 9 is a perspective view illustrating another braced oblique wing aircraft 900, according to an embodiment of the present invention. Aircraft 900 includes a continuous span wing 910, where wing 910 is attached to fuselage 920 with a mechanical pivot 930, one or more braces that reduce wing root bending moments 940, associated brace-to-wing junctions 950, and one or more brace-to-fuselage mechanical pivots 960. The sweep of wing 910 may be adjusted in-flight to maximize aircraft performance and efficiency and adjusted on the ground to minimize aircraft spotting factor. In this embodiment, a propulsion system 970 is mounted on wing 910 and pivots so that its principal thrust axis maintains alignment with fuselage 920 of aircraft 900.

Figure 10:
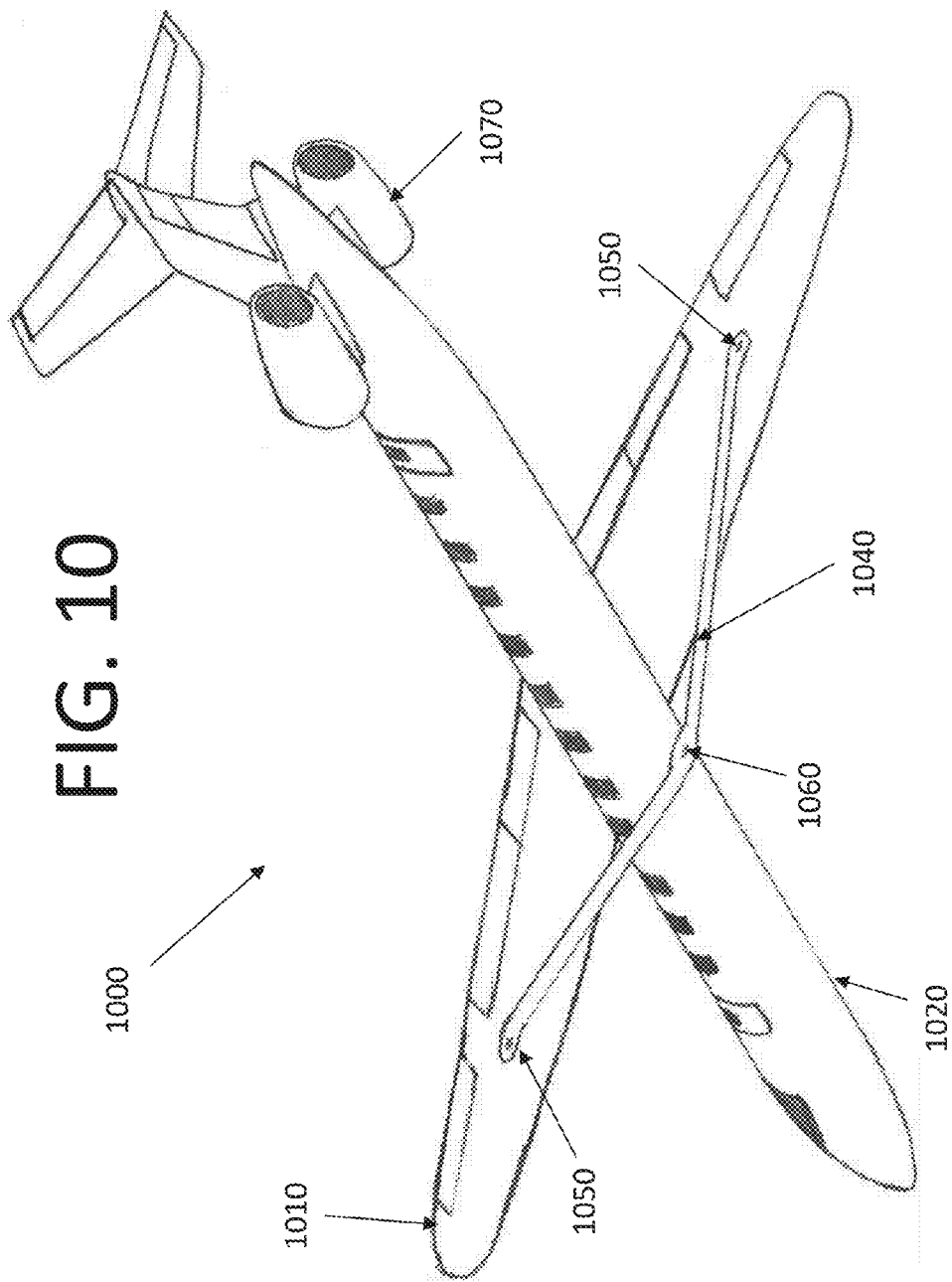
FIG. 10 is a perspective view illustrating a further braced oblique wing aircraft, according to an embodiment of the present invention.

FIG. 10 is a perspective view illustrating a braced oblique wing aircraft 1000, according to an embodiment of the present invention. Aircraft 1000 includes a continuous span wing 1010, where the wing is attached to a fuselage 1020 with a mechanical pivot (not shown), a brace(s) 1040 that reduce wing root bending moments, an associated brace-to-wing junction 1050, and a brace-to-fuselage mechanical pivot 1060. The sweep of wing 1010 may be adjusted in-flight to maximize aircraft performance and efficiency and adjusted on the ground to minimize aircraft spotting factor. In this embodiment, each of two or more propulsion systems 1070 are affixed to fuselage 1020.

Figure 11:
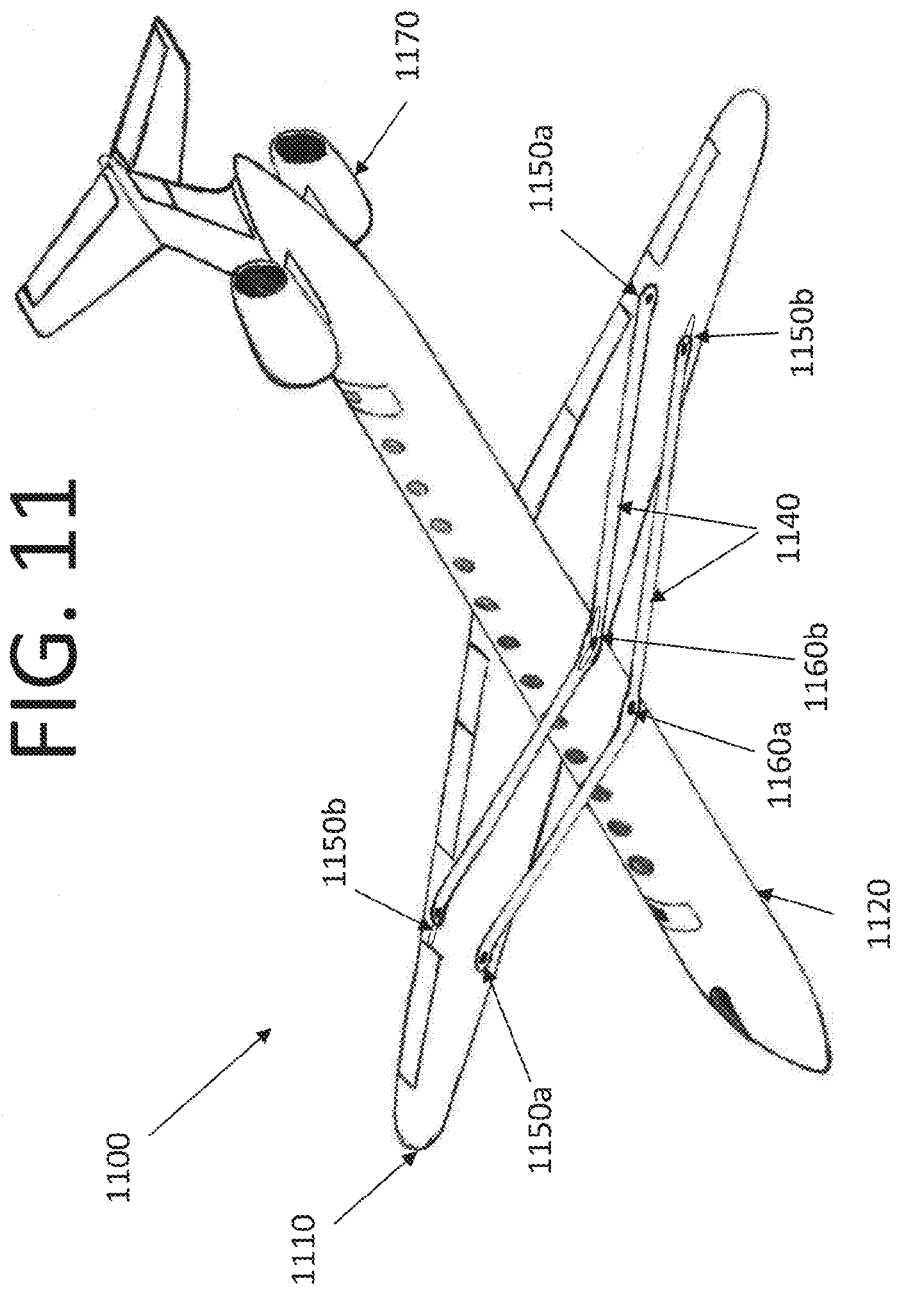
FIG. 11 is a perspective view illustrating yet another braced oblique wing aircraft, according to an embodiment of the present invention.

FIG. 11 is a perspective view illustrating a braced oblique wing aircraft 1100, according to an embodiment of the present invention. Aircraft 1100 includes a continuous span wing 1110, where the wing is attached to a fuselage 1120 with a mechanical pivot (not shown). The aircraft also includes two braces 1140 (or four braces if the two braces are not continuous) that reduce wing root bending moments, an associated brace-to-wing junction which may be a fixed junction 1150*a* and/or a sliding junction 1150*b*, and a brace-to-fuselage mechanical pivot which may be a rotating pivot 1160*a* and/or a sliding pivot 1160*b*. The sweep of wing 1110 may be adjusted in-flight to maximize aircraft performance and efficiency and adjusted on the ground to minimize aircraft spotting factor. In this embodiment, each of two or more propulsion systems 1170 are affixed to fuselage 1120.

Figure 12:
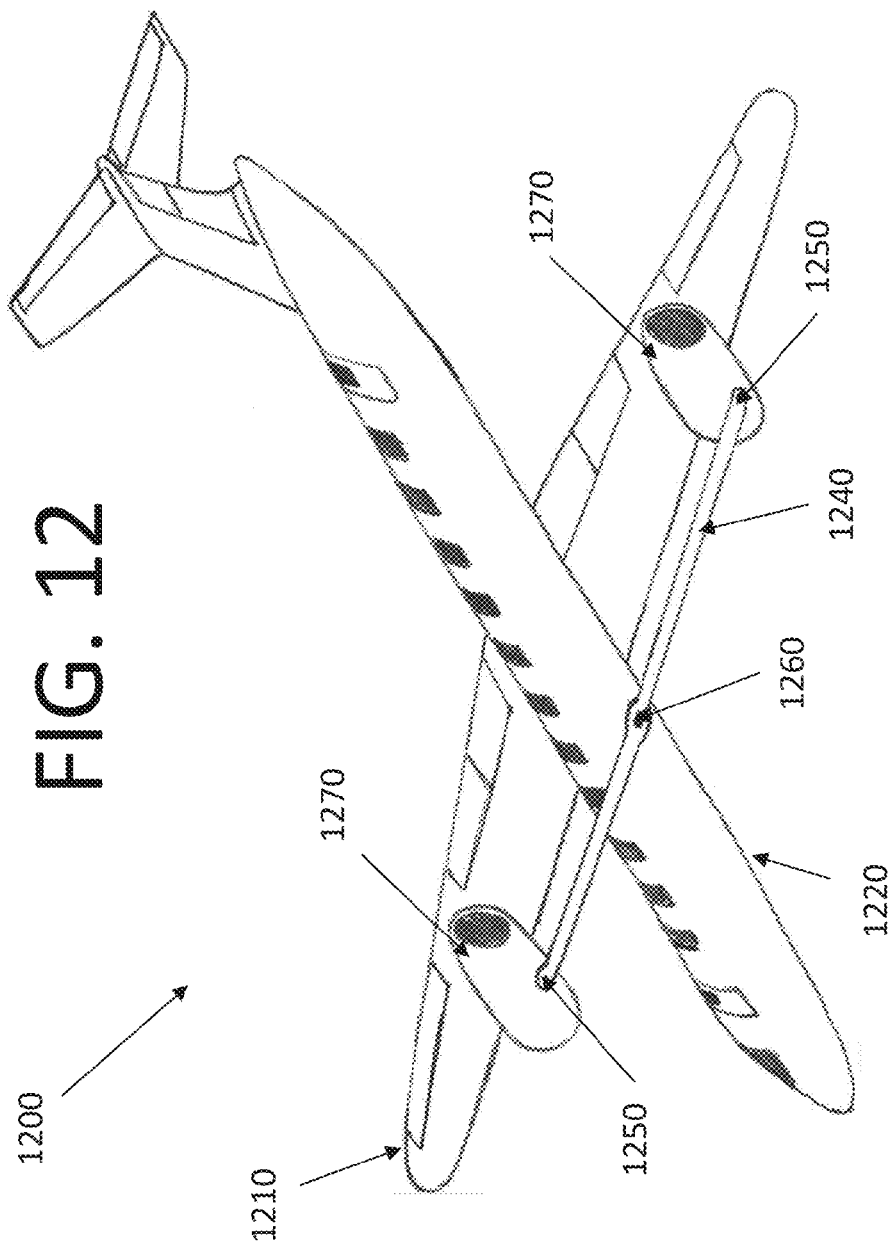
FIG. 12 is a perspective view illustrating an alternative braced oblique wing aircraft, according to an embodiment of the present invention.

FIG. 12 is a perspective view illustrating a braced oblique wing aircraft 1200, according to an embodiment of the present invention. Aircraft 1200 includes a continuous span wing 1210, where the wing is attached to a fuselage 1220 with a mechanical pivot (not shown), a brace(s) 1240 that reduces wing root bending moments, an associated brace-to-propulsion system junction 1250, and a brace-to-fuselage mechanical pivot 1260. The sweep of wing 1210 may be adjusted in-flight to maximize aircraft performance and efficiency and adjusted on the ground to minimize aircraft spotting factor. In this embodiment, each of two or more wing mounted propulsion systems 1270 are affixed to wing 1210 by means of pivots (not shown). The alignment of propulsion systems 1270 is controlled proportionally relative to the pivot of the wing 1210, by mechanical, electrical, and/or hydraulic control mechanisms, to thereby align the longitudinal axis of the propulsion systems 1270 generally parallel to the longitudinal axis of the fuselage 1220.

FIG. 13 is a perspective view illustrating a braced oblique wing aircraft 1300, according to an embodiment of the present invention. Aircraft 1300 includes a continuous span wing 1310, where the wing is attached to a fuselage 1320 with a mechanical pivot (not shown). The aircraft also includes two braces 1340 (or four braces if the two braces are not continuous) that reduce wing root bending moments, an associated brace-to-propulsion system junction 1350, and a brace-to-fuselage mechanical pivot which may be a rotating pivot 1360*a* and/or a sliding pivot 1360*b*. The sweep of wing 1310 may be adjusted in-flight to maximize aircraft performance and efficiency and adjusted on the ground to minimize aircraft spotting factor. In this embodiment, each of two or more wing mounted propulsion systems 1370 are affixed to wing 1310 by means of pivots (not shown). The alignment of propulsion systems 1370 is controlled proportionally relative to the pivot of the wing 1310, by mechanical, electrical, and/or hydraulic control mechanisms, to thereby align the longitudinal axis of the propulsion systems 1370 generally parallel to the longitudinal axis of the fuselage 1320.

It is further contemplated that the braces described in the various embodiments of the present invention are rotatable along their longitudinal axis. For example, as shown in FIGS. 2, 3, and 8-13, the braces are configured with a leading edge (the edge facing the relative wind) and a trailing edge. As the oblique wing pivots relative to the fuselage, the braces turn thereby causing the leading edge of the braces to turn away from the relative wind and exposing more surface area of the braces to the relative wind. To reduce the drag caused by rotated braces, the braces themselves can pivot along their longitudinal axis to place the leading edge of the braces facing the relative wind. The pivoting of the braces along their longitudinal axis may be performed via mechanical linkage, electrical motors, hydraulic actuators, or the like.

In alternative embodiments, one or more engines may be mounted to the oblique wing by a fixed attachment. As shown in FIG. 14A, an engine 1420 is connected to the unswept wing 1410 (low-speed configuration) with a fixed attachment. The engine 1420 is aligned with the flow of oncoming air in the unswept wing configuration. A rotating or pivoting air inlet 1430 is positioned to direct the oncoming air flow into the engine 1420, where the central axis of the inlet 1430 and the longitudinal axis of the engine 1420 are generally aligned. A rotating or pivoting exhaust nozzle 1440 is positioned to direct the engine exhaust flow from the engine 1420, where the central axis of the nozzle 1440 is generally aligned with the longitudinal axis of the engine 1420. In FIG. 14B, the engine 1420 is connected to the swept wing 1410 (high-speed configuration) with a fixed attachment. The engine 1420 is not aligned with the flow of oncoming air in the swept wing configuration. To redirect the oncoming air flow into the engine 1420, the rotating or pivoting air inlet 1430 is positioned such that the central axis of the inlet 1430 and the longitudinal axis of the engine 1420 are at an angle to each other. To redirect the engine exhaust flow generally aft and generally parallel to the oncoming air flow, the rotating or pivoting exhaust nozzle 1440 is positioned such that the central axis of the nozzle 1440 and the longitudinal axis of the engine 1420 are at an angle to each other.

Figure 15A:
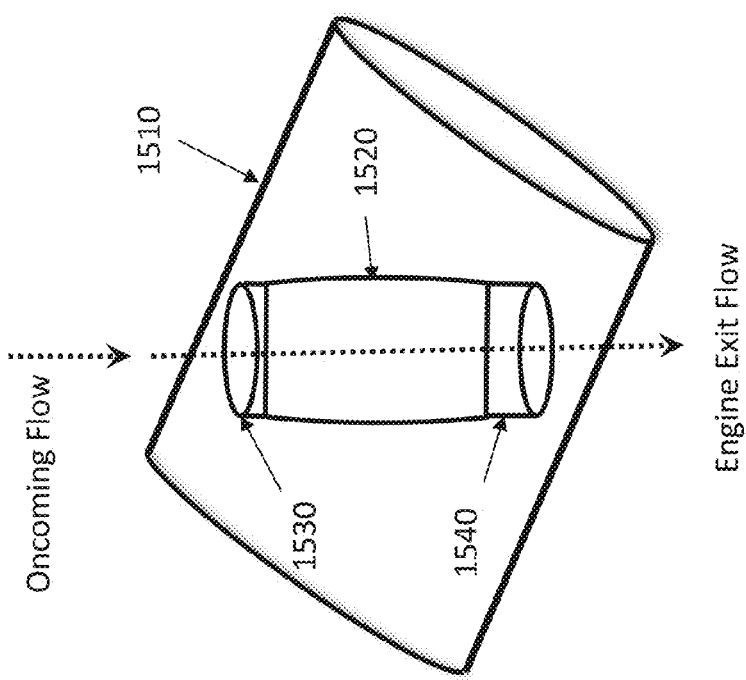
FIG. 15A illustrates an embodiment of the present invention showing an engine not aligned with oncoming air flow when the wing is unswept.
Figure 15B:
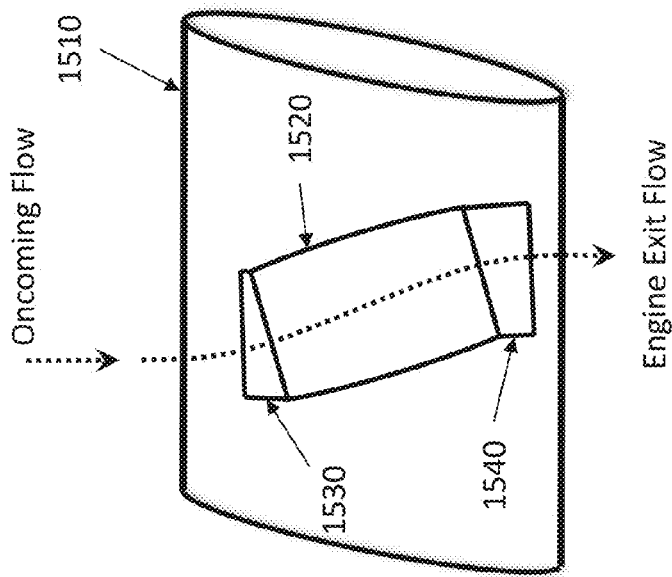
FIG. 15B illustrates the embodiment of FIG. 15A showing the engine aligned with oncoming air flow when the wing is swept.

Another embodiment where one or more engines are mounted to the oblique wing by a fixed attachment is shown in FIGS. 15A and 15B. In FIG. 15A, an engine 1520 is connected to the unswept wing 1510 (low-speed configuration) with a fixed attachment. The engine 1520 is misaligned, or not parallel, with the flow of oncoming air in the unswept wing configuration. To redirect the oncoming air flow into the engine 1520, the rotating or pivoting air inlet 1530 is positioned such that the central axis of the inlet 1530 and the longitudinal axis of the engine 1520 are at an angle relative to each other. To redirect the engine exhaust flow generally aft and generally parallel to the oncoming air flow, the rotating or pivoting exhaust nozzle 1540 is positioned such that the central axis of the nozzle 1540 and the longitudinal axis of the engine 1520 are at an angle relative to each other. In FIG. 15B, the engine 1520 is connected to the swept wing 1510 (high-speed configuration) with a fixed attachment. The engine 1520 is aligned with the flow of oncoming air in the swept wing configuration. The rotating or pivoting air inlet 1530 is positioned to direct the oncoming air flow into the engine 1520, where the central axis of the inlet 1530 and the longitudinal axis of the engine 1520 are generally aligned. The rotating or pivoting exhaust nozzle 1540 is positioned to direct the engine exhaust flow from the engine 1520, where the central axis of the nozzle 1540 is generally aligned with the longitudinal axis of the engine 1520.

In the embodiments of FIGS. 14A, 14B, 15A, and 15B, the inlet and nozzle are reconfigured or rotated to efficiently turn the engine's inlet and exit flows as the wing is swept for operation at higher speeds and unswept for operation at lower speeds. The exhaust nozzle of the engine may also be configured to direct engine thrust in any desired direction, i.e., vectored thrust. Such embodiments with the engine rigidly mounted to the oblique wing may be more structurally efficient than the embodiments with the engine rotatably mounted to the oblique wing.

It is further contemplated that the embodiments of FIGS. 14A, 14B, 15A, and 15B may include brace(s) as described above with reference to FIGS. 2, 3, and 8-13. For example, a brace(s) (strut and/or truss) may extend between the fuselage and oblique wing or between the fuselage and propulsion systems.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. An aircraft having variable airframe geometry for accommodating efficient flight at low speeds and as speed increases towards supersonic speeds, the aircraft comprising:
   an elongated fuselage;
   an oblique wing pivotally connected with said fuselage;
   a wing pivoting mechanism connected with said oblique wing and said fuselage;
   a rotating joint connected with said fuselage; and
   a strut operably connected between said oblique wing and said rotating joint, said strut being a load carrying structure and having an airfoil shaped cross section.

2. The aircraft of claim 1, wherein said wing pivoting mechanism rotates said oblique wing and said strut relative to said fuselage such that one end of said oblique wing is closer to the front of the aircraft and another end of said oblique wing is closer to the rear of the aircraft during high speed flight.

3. The aircraft of claim 1, wherein said wing pivoting mechanism rotates said oblique wing and said strut such that said oblique wing is generally perpendicular to said fuselage during low speed flight.

4. The aircraft of claim 1, wherein said strut includes first and second parallel struts operably connected between said oblique wing and said fuselage.

5. The aircraft of claim 4, further comprising a rotating or sliding joint between said fuselage and at least one of said first and second parallel struts.

6. The aircraft of claim 4, further comprising a rotating or sliding joint between said oblique wing and at least one of said first and second parallel struts.

7. The aircraft of claim 1, wherein said strut is configured to rotate about its longitudinal axis such that the leading edge of said strut generally faces the relative wind as said oblique wing and said strut rotate relative to said fuselage.

8. The aircraft of claim 1, further comprising a propulsion system rigidly connected with said oblique wing, said propulsion system including an engine, a rotating inlet, and a rotating nozzle, such that as the oblique wing moves between an unswept configuration and a swept configuration, the rotating inlet moves to redirect oncoming air flow into the engine and the rotating nozzle moves to redirect engine exit flow generally aft of the engine.

9. The aircraft of claim 1, wherein said strut is operably connected with said rotating joint, a port-side joint on said oblique wing, and a starboard-side joint on said oblique wing.

10. The aircraft of claim 1, wherein said strut includes first and second struts, wherein said first strut is operably connected with said rotating joint and a port-side joint on said oblique wing, and wherein said second strut is operably connected with said rotating joint and a starboard-side joint on said oblique wing.

11. An aircraft having variable airframe geometry for accommodating efficient flight at low speeds and as speed increases towards supersonic speeds, the aircraft comprising:
    an elongated fuselage;
    an oblique wing pivotally connected with said fuselage;
    a wing pivoting mechanism connected with said oblique wing and said fuselage;
    a propulsion system pivotally connected with said oblique wing;
    a rotating joint connected with said fuselage; and
    a strut operably connected between said propulsion system and said rotating joint, said strut being a load carrying structure and having an airfoil shaped cross section.

12. The aircraft of claim 11, further comprising a rotating joint between said strut and said propulsion system.

13. The aircraft of claim 11, wherein said wing pivoting mechanism rotates said oblique wing and said strut relative to said fuselage such that one end of said oblique wing is closer to the front of the aircraft and another end of said oblique wing is closer to the rear of the aircraft during high speed flight and wherein the longitudinal axis of said propulsion system remains generally parallel to the longitudinal axis of said fuselage.

14. The aircraft of claim 11, wherein said wing pivoting mechanism rotates said oblique wing and said strut such that said oblique wing is generally perpendicular to said fuselage during low speed flight and wherein the longitudinal axis of said propulsion system remains generally parallel to the longitudinal axis of said fuselage.

15. The aircraft of claim 11, wherein said strut includes first and second parallel struts operably connected between said propulsion system and said fuselage.

16. The aircraft of claim 15, further comprising a rotating or sliding joint between said fuselage and at least one of said first and second parallel struts.

17. The aircraft of claim 15, further comprising a rotating joint between said propulsion system and at least one of said first and second parallel struts.

18. The aircraft of claim 11, wherein said strut is configured to rotate about its longitudinal axis such that the leading edge of said strut generally faces the relative wind as said oblique wing and said strut rotate relative to said fuselage.

19. The aircraft of claim 11, wherein said propulsion system includes port and starboard propulsion systems, and wherein said strut is operably connected with said rotating joint, said port propulsion system, and said starboard propulsion system.

20. An aircraft having variable airframe geometry for accommodating efficient flight, the aircraft comprising:
an elongated fuselage;
an oblique wing pivotally connected with said fuselage;
a wing pivoting mechanism connected with said oblique wing and said fuselage;
a propulsion system rigidly connected with said oblique wing, the propulsion system including an engine, a rotating inlet, and a rotating nozzle;
a brace operably connected between said propulsion system and said fuselage; and
a rotating joint between said brace and said fuselage;
wherein said wing pivoting mechanism rotates said oblique wing and said brace relative to said fuselage such that one end of said oblique wing is closer to the front of the aircraft and another end of said oblique wing is closer to the rear of the aircraft during high speed flight and such that said oblique wing is generally perpendicular to said fuselage during low speed flight.

21. The aircraft of claim 20, wherein the longitudinal axis of said propulsion system rigidly mounted to said oblique wing remains generally perpendicular to said oblique wing and wherein the rotating inlet moves to redirect oncoming air flow in the engine and the rotating nozzle moves to redirect engine exhaust flow generally aft of the engine.

22. The aircraft of claim 21, wherein said brace is configured to rotate about its longitudinal axis such that the leading edge of said brace generally faces the relative wind as said oblique wing and said brace rotate relative to said fuselage.

* * * * *